United States Patent
Kaus et al.

(10) Patent No.: US 9,135,748 B2
(45) Date of Patent: Sep. 15, 2015

(54) TRIANGULATION METHOD OF A SURFACE OF A PHYSICAL OBJECT

(75) Inventors: Michael Kaus, Toronto (CA); Matthias Wolfgang Meyer, Hannover (DE)

(73) Assignee: Koninklijke Philips N.V., Eindhoven (NL)

( * ) Notice: Subject to any disclaimer, the term of this patent is extended or adjusted under 35 U.S.C. 154(b) by 1198 days.

(21) Appl. No.: 12/064,368

(22) PCT Filed: Aug. 17, 2006

(86) PCT No.: PCT/IB2006/052837
§ 371 (c)(1),
(2), (4) Date: Feb. 21, 2008

(87) PCT Pub. No.: WO2007/023427
PCT Pub. Date: Mar. 1, 2007

(65) Prior Publication Data
US 2008/0218513 A1    Sep. 11, 2008

(30) Foreign Application Priority Data
Aug. 22, 2005   (EP) .................................... 05107689

(51) Int. Cl.
G06T 15/00   (2011.01)
G06T 15/04   (2011.01)
G06T 15/08   (2011.01)
G06T 17/00   (2006.01)
G06T 17/20   (2006.01)
G06T 19/00   (2011.01)

(52) U.S. Cl.
CPC ............... G06T 17/20 (2013.01); G06T 17/205 (2013.01)

(58) Field of Classification Search
USPC .................................... 345/423, 420; 382/128
See application file for complete search history.

(56) References Cited

U.S. PATENT DOCUMENTS

| | | | |
|---|---|---|---|
| 6,016,153 A | 1/2000 | Gueziec et al. | |
| 6,611,267 B2 * | 8/2003 | Migdal et al. | 345/428 |
| 7,274,364 B2 * | 9/2007 | Sederberg | 345/420 |

OTHER PUBLICATIONS

Bernard Reitinger et al., "Constructing Smooth Non-Manifold Meshes of Multi-Labeled Volumetric Datasets", In Proc. International Conference in Central Europe on Computer Graphics, Visualization and Computer Vision, WSCG 2005, pp. 227-234, [Jan. 31, 2005].*

Nils Krahnstoever et al., "Computing Curvature-Adaptive Surface Triangulations of Three-Dimensional Image Data", Visual Comput, vol. 20, No. 1, pp. 17-36, [Apr. 30, 2004].*

Aaron Hertzmann, "Introduction to 3D Non-Photorealistic Rendering: Silhouettes and Outlines," Non-Photorealistic Rendering (Siggraph 99 Course Notes), S. Green, ed., ACM Press, [1999].*

(Continued)

*Primary Examiner* — Ke Xiao
*Assistant Examiner* — Jed-Justin Imperial

(57) ABSTRACT

An exemplary embodiment of the invention provides a method for producing a triangulation of a surface of a physical object the method comprising the steps of generating an intermediate mesh representation of the surface out of surface voxels (102) and detecting at least one T-junction in the intermediate mesh representation (103). The method further comprising the steps of decomposing of the at least one T-junction into at least one triangle and at least one two-point-polygon (104), and generating the triangulation of the surface out of the modelled intermediate mesh representation (107).

17 Claims, 3 Drawing Sheets

(56) References Cited

OTHER PUBLICATIONS

Bernard Reitinger, et al: Constructing Smooth Non-Manifold Meshes of Multi-Labeled Volumetric Datasets Conference Proceedings WSCG, Jan. 31, 2005, pp. 227-234.

Nils Krahnstoever, et al: Computing Curvatue-Adaptive Surface Triangulations of Three-Dinensional Image Data, The Visual Computer, vol. 20, No. 1, Apr. 30, 2004, pp. 17-36.

Leila De Floriani, et al: Representation of Non-Manifold Objects Through Decomposition into Nearly Manifold Parts, Proceedings 8th ACM Symposium on Solid Modeling and Applications, Proceedings of the Symposium on Solid Modeling and Applications, New York, Jun. 16, 2003, pp. 304-309.

Shuntaro Yamazaki, et al: Non-Manifold Implicit Surfaces Based on Discotinuous Implicitization and Polygonization, Proceedings of the Geometric Modeling and Proceeding, Theory and Applications, IEEE 2002, pp. 1-9.

Michael R. Kaus, et al: Automated 3-D PDM Construction From Segmented Images Using Deformable Models, IEEE Transactions on Medical Imaging, vol. 22, No. 8, Aug. 2003, pp. 1005-1013.

* cited by examiner

TRIANGULATION METHOD OF A SURFACE OF A PHYSICAL OBJECT

FIELD OF INVENTION

The invention relates to the field of triangulation methods. In particular, the invention relates to a triangulation method of multiple objects with common boundaries in labelled 3D images. The invention further relates to a system, a computer readable medium, a program element, an image acquisition device and an image workstation designed to perform such a triangulation method.

ART BACKGROUND

Geometrical surface-models of anatomical structures are commonly represented by three-dimensional (3D) triangular surface meshes. Such a 3D triangular surface mesh representation of an object generally works well in case that the dataset from which the surfaces mesh is reconstructed represents a 2-manifold, i.e. can be divided into voxels lying "inside" or "outside" of the object.

However, many clinical applications require the representation and segmentation of several structures, like adjacent organs arranged next to each other, thus representing a non-2-manifold. Prominent examples are the heart with its heart chambers and heart valves, or the pelvic region housing bladder, prostate and rectum. In such a case a triangle of the 3D surface mesh may have more than three neighbouring triangles, in particular in areas where surfaces of the objects form so called 3D T-junction, i.e. a junction where two or more different objects meet each other. In particular, in such a 3D T-junction case the image features are ambiguous and lead to segmentation errors when the 3D triangular surface mesh is constructed. Thus, the generation of such surface models cannot be done with standard triangulation methods.

Image segmentation using so called deformable models are an important technology in medical applications. This technique can provide shape information of the single objects adjacent to each other, thus reducing ambiguity in the image content and leading to more robust segmentation results. Typical shapes of organs are often represented by triangular surface meshes. The robustness of these methods can be improved by adding information about special relationships of multiple objects. For example, the adding can be done by representing multiple objects with common or touching boundaries with a single mesh structure.

Combining separately constructed triangular meshes using Boolean geometrical operations is cumbersome and requires usually manual interactions. Another way to handle the construction of smooth non-2-manifold meshes is described in "Constructing Smooth Non-Manifold Meshes of Multi-Labeled Volumetric Datasets" from Bernhard Reitinger et al., Conference Proceedings WSCG 2005, Jan. 31-Feb. 4, 2005. Reitinger et al. relates to the construction of smooth meshes out of multilabelled datasets by subdividing cells comprising two or more materials, which corresponds to the case of the touching of two or more organs in the human body. In the two-dimensional (2D) case the subdivision is achieved by inserting a cell mid-point. Additionally, segment mid-points are generated if the labels of two adjacent so-called voxels (volume pixels) are different. For each generated segment mid-point a new segment (line) to the cell mid-point is generated. The same strategy of inserting additional cell mid-points can be used for the 3D case.

However, there may be the need for another method for a triangulation method of multiple objects.

SUMMARY OF THE INVENTION

An exemplary embodiment of the invention provides a method for producing a triangulation of a surface of a physical object the method comprising the steps of generating an intermediate mesh representation of the surface out of surface voxels and detecting at least one T-junction in the intermediate mesh representation. The method further comprising the steps of decomposing the at least one T-junction into at least one triangle and at least one two-point-polygon, and generating the triangulation of the surface out of the modelled intermediate mesh representation.

According to this application a T-junction is an occurrence where more than two polygons share a common edge. The T-junction may be decomposed by detaching the polygons from each other, replacing the common edge by a 2-point-polygon/line segment and attaching the polygons to the newly created 2-point-polygons. The connected sets of 2-point-polygons may form seams between the different surfaces.

Moreover, an exemplary embodiment relates to a system for producing a triangulation of a surface of a physical object the system comprises a processor which is adapted to perform the following method steps generating an intermediate mesh representation of the surface out of surface voxels, detecting at least one T-junction in the intermediate mesh representation, decomposing the at least one T-junction into at least one triangle and at least one two-point-polygon, and generating the triangulation of the surface out of the modelled intermediate mesh representation.

Further, an exemplary embodiment relates to a computer readable medium in which a program for producing a triangulation of a surface of a physical object is stored which program comprises the following method steps, if executed by a processor. Generating an intermediate mesh representation of the surface out of surface voxels, detecting at least one T-junction in the intermediate mesh representation, decomposing the at least one T-junction into at least one triangle and at least one two-point-polygon, and generating the triangulation of the surface out of the modelled intermediate mesh representation.

Furthermore, an exemplary embodiment relates to a program element for producing a triangulation of a surface of a physical object the program element comprises the following method steps if executed by a processor generating an intermediate mesh representation of the surface out of surface voxels, detecting at least one T-junction in the intermediate mesh representation, decomposing the at least one T-junction into at least one triangle and at least one two-point-polygon, and generating the triangulation of the surface out of the modelled intermediate mesh representation.

Furthermore, further exemplary embodiments relate to an image acquisition device and an image workstation comprising the system according to the invention.

The present invention may provide for a method for triangulation of a physical object, e.g. for a triangulation of human organs. Triangulation according to this application means the construction of a three-dimensional mesh of triangles that represent a surface of the physical object. In particular, the triangulation can be determined out of so called voxels, i.e. volume pixels, which can be determined by tomographic methods like Computer Tomography, Magnetic Resonance Imaging or Positron Emission Tomography.

A characteristic feature according to the present invention may be that so called T-junctions, i.e. areas where two or more objects touch each other and triangles of the triangulation of the surface would have more than three neighbouring triangles, are decomposed into sets of triangles and 2-point-polygons. In other words the term T-junction describes the fact that some triangles are part of a surface that have more than one adjacent surface. That is a T-junction is an area where surfaces of different objects touching each other, like a surface where different humans organs laying next to each other, i.e. having one common boundary. Such T-junctions lead to non-2-manifold surface meshes that are difficult to handle using ordinary triangulation methods. The decomposing of the T-junction may ensure that surface parts belonging to different human organs are only connected via those 2-point-polygons, such that the 2-manifold-condition, i.e. always three neighbours per triangle, may hold true for each surface part.

The characteristic features according to the invention may have particularly the advantage that the decomposition of T-junctions into triangles and 2-point-polygons can be carried out so that the 2-manifold condition can hold true. In this way a basic assumption of triangulation, i.e. every triangle has exactly three adjacent triangles, may be preserved and basic features of common triangulation methods may be used. Thus, standard triangulation methods may be used.

Referring to the dependent claims, further preferred embodiments of the invention will be described in the following.

Next, preferred exemplary embodiments of the method of the invention will be described. These embodiments may also be applied for the system, the computer readable medium, the program element, the image acquisition device, and the image workstation.

In an exemplary embodiment the method further comprises the step of decomposing more than two two-point-polygons which meet at a common vertex by inserting a one-point-polygon.

After the decomposing of the at least one T-junction into at least one triangle and at least one two-point-polygon it can occur that a second type of T-junction occurs when more than two 2-point-polygons meet at a common voxel/vertex. These occurrences of T-junctions may be decomposed by detaching the 2-point-polygons from each other, inserting a 1-point-polygon at the vertex and connecting the 2-point-polygons to the newly created 1-point-polygon.

In a further exemplary embodiment of the method the physical object comprises at least two distinct sections, and the method further comprising the step of labelling at least some of the surface voxels prior to generating the intermediate mesh representation the labelling representing the belonging of each labelled surface voxel to one of the at least two distinct sections.

In yet another exemplary embodiment the method further comprising the step of connecting at least one pair of adjacent voxels having different labels by a two-point-polygon and/or a one-point-polygon during the decomposing.

In still another exemplary embodiment the method further comprising the step of connecting each pair of adjacent voxels having different labels by a two-point-polygon and/or a one-point-polygon.

Preferably, multiple connected T-junctions, e.g. T-junctions connected to multiple organs, are associated with a correct subset of neighbouring surface labels, e.g. each T-junction is associated with the correct subset of neighbouring organs. Preferably, this associating is done before decomposing the T-junctions.

By ensuring that each pair of adjacent voxels having different labels is connected by a two-point-polygon it may be ensured that the 2-manifold-condition is met and standard triangulation methods may be applied.

In yet another exemplary embodiment the method further comprising the step of region growing after decomposing of the at least one T-junction.

By using region growing the number of voxels can be reduced which may lead to a faster generation of the triangulation of the surface of a physical object and to a significant reduction of triangles while preserving the accuracy of the triangular representation. The region growing may be implemented by a selection of vertices from the intermediate mesh representation the so-called micro mesh.

In yet still another exemplary embodiment the region growing is done by using a local curvature-adaptive thinning process.

The using of a local curvature-adaptive thinning process, e.g. a process in which some vertices are selected leading to a resizing of the voxels, is depending on the local curvature of the object which shall be depicted by the triangulation, it may be possible to ensure that loss of information on the surface structure is minimized while the number of voxels is considerable reduced.

In a further exemplary embodiment the method the region growing is adapted so that no voxel having one label is shifted into a surface region comprising voxels of another label.

By modifying the growing such that no voxel of a surface having a first label, e.g. belongs to a first organ, is shifted into a surface region having a second label, e.g. belongs to a second organ, it may be ensured that the triangulation is correctly executed, i.e. that the surface of the different organs is correctly modelled.

In another further exemplary embodiment the method the intermediate mesh representation comprises triangles and boundary edges and the region growing is adapted so that regions starting from boundary polygons may only grow along boundary polygons and regions starting from surface polygons may only grow into surface polygons.

In still a further exemplary embodiment of the method the generation of the triangulation is done by Delaunay-Triangulation.

According to this exemplary embodiment the triangulation is done by a Delaunay-Triangulation from the Voronoi-graph which is determined by the voxels.

In yet still a further exemplary embodiment the method further comprising the step of correcting an orientation of triangles associated with the at least one T-junction.

By implementing a step of correction of the orientation of triangles associated with the at least one T-junction it may be secured that orientations, which may be not well defined after generating the triangulation, are correctly shown in the generated image. The correcting can be done by using the orientation of neighbouring triangles.

One aspect of the present invention might be seen in decomposing T-junctions into triangles and two-point-polygons and one-point-polygons so that standard triangulation methods can be used, because the 2-manifold condition can be met.

The present invention may be of particular interest in the field of medical uses, e.g. in imaging of surfaces of physical objects, in particular in imaging organs of human beings by using voxel representation obtained by tomographic imaging. For example, the present invention may be implemented in the medical image post-processing, e.g. in software products containing model-based segmentation algorithms.

The aspects defined above and further aspects of the invention are apparent from the examples of embodiment to be described hereinafter and are explained with reference to the examples of embodiment.

The invention will be described in more detail hereinafter with reference to examples of embodiment but to which the invention is not limited.

BRIEF DESCRIPTION OF THE DRAWINGS

FIG. 2 shows schematic examples of triangulations according to an exemplar embodiment of the present invention, wherein

DETAILED DESCRIPTION

Figure 1:
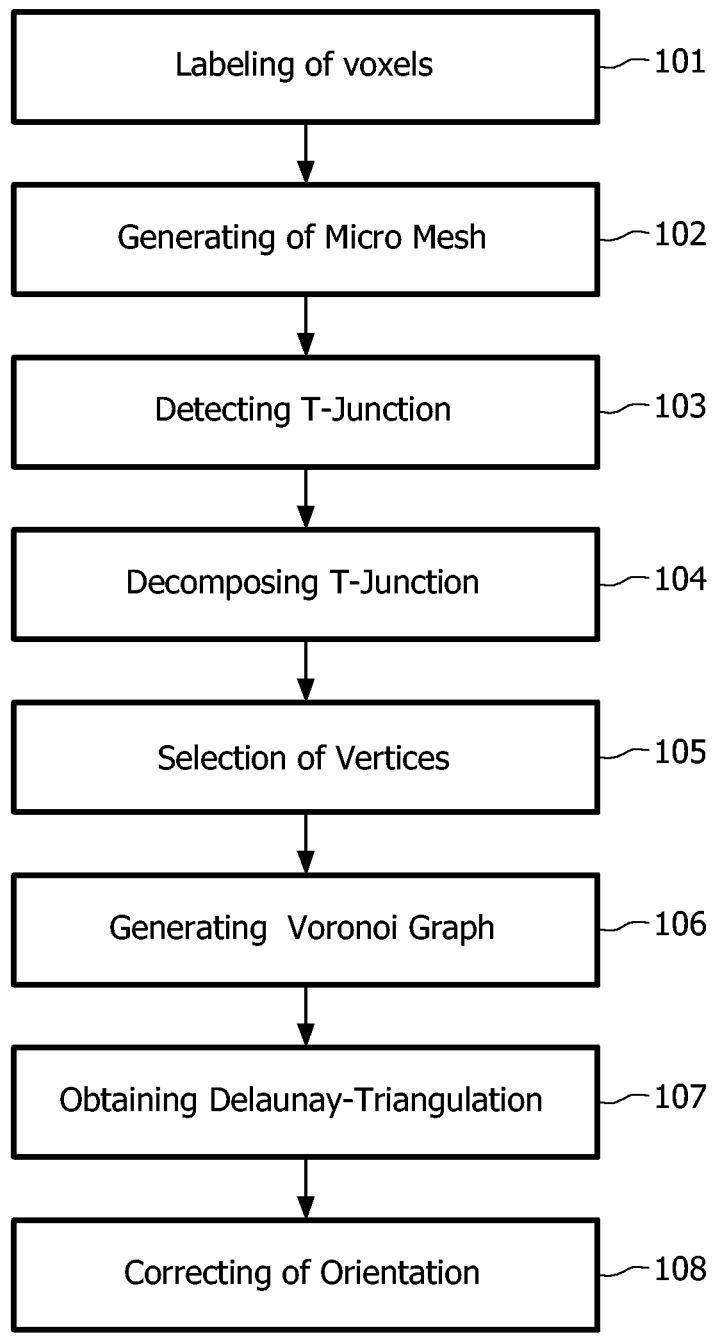
FIG. 1 shows a schematic flow chart of an exemplary embodiment of the present invention.

The illustration in the drawing is schematically. In different drawings, similar or identical elements are provided with the same or similar reference signs.

In the following, referring to FIG. 1, a method of producing a triangulation of a surface of a physical object according to an exemplary embodiment of the present invention comprises the step of labelling voxels 101. The labelling may be used to determine which voxels belonging to which part of the physical object, e.g. to which organ, when the physical object represents a number of organs scanned by a tomography. After the labelling 101 an intermediate mesh representation, a so called micro mesh, of the surface of the physical object is generated 102, wherein the surface is preferably defined by all surface voxels. The generation may be done by standard methods, for example according to the method described in "Computing curvature-adaptive surface triangulations of three-dimensional image data", N. Krahnstoever, C. Lorenz, in "The Visual Computer" (2004) page 17 to 35 and implemented herein by reference. In particular, the method that can be used is described in chapter 2 on pages 19 to 24.

After the generating of the micro mesh surface T-junctions are detected 103, e.g. areas of the surface of the micro mesh where two or more organs touch each other and triangles of the generated triangulation would have more than three neighbouring triangles. Such T-junctions may lead to segmentation faults when a Delaunay-Triangulation of the respective physical object is generated out of a Voronoi-graph. In a further step the detected T-junctions are modelled by 2-point-polygons 104. Thereby, the T-junctions may be decomposed into sets of triangles and 2-point-polygons. While doing this decomposition it may be ensured that surface parts of different labelling, e.g. surface parts belonging to different organs, are connected only via those 2-point-polygons. Thus, the 2-manifold-condition—e.g. always exactly three neighbours per triangle—of the micro mesh holds true for each surface part. In this way the basic assumption, i.e. every triangle has exactly 3 adjacent triangles) may be preserved and standard algorithms may be used for triangulation.

Preferably, multiple connected T-junctions, e.g. T-junctions connected to multiple organs, are associated with an correct subset of neighbouring surface labels, e.g. each T-junction is associated with the correct subset of neighbouring organs. Preferably, this associating is done before decomposing the T-junctions. By using such an associating step it may be ensured to obtain afterwards a correct Delaunay-Triangulation from the Voronoi-graph.

After decomposing in a next step 105 vertices from the micro mesh may be selected according to a so called thinning process. Thus, the number of vertices used for a subsequent triangulation is reduced saving processing power. Preferably, the thinning process is a local curvature-adaptive thinning process as described for example in above mentioned "Computing curvature-adaptive surface triangulations of three-dimensional image data", N. Krahnstoever, C. Lorenz, in "The Visual Computer" (2004), pages 17 to 35, wherein the curvature-adaptive thinning is in particular described in chapter 3, on pages 24 to 28. Due to the thinning step, the number of vertices, or with other words the number of surface voxels, is reduced on which vertices a discrete approximation of the Voronoi-graph on the surface of the physical object is based on. From this discrete approximation of the Voronoi-graph its dual the surface Delaunay-Triangulation can be generated. By using a local curvature-adaptive thinning process the local shape of the physical object is incorporated in an early stage of the algorithm yielding an elegant method for obtaining shape-adaptive triangular meshes.

The thinning corresponds to a growing of the surface regions which are represented by the voxels. One surface region is represented by substantially all adjacent surface voxels having substantially the same outer surface orientation, i.e. can be approximated by a single triangle, without loosing a great amount of information. The loosing of information is thereby dependent on the rate of the thinning. Preferably, the region growing is modified so that no vertex that is labelled with a first label is shifted into a region in which vertices having a different second label. Furthermore, the region growing preferably is adapted so that no vertex that is part of a triangle is shifted to a boundary edge of the boundary edge, or vice versa, i.e. no vertex that is part of a boundary edge is shifted to a triangle.

After carrying out the thinning process the selected vertices are used to generate the Voronoi-graph 106 from which the Delaunay-Triangulation can be obtained 107.

After obtaining the Delaunay-Triangulation a further step of correcting orientations of triangles which are associated with decomposed T-junctions may be implemented. The correcting can be made from the orientation of neighbouring triangles. Thus, a well-defined final triangulation can be ensured even if the orientation of the triangles associated with T-junctions are originally not well defined after obtaining the Delaunay-Triangulation.

In the following a triangulation process according a detailed exemplary embodiment of the present invention will be described in more detail.

The triangulation process may be divided into four major tasks, which will be described later in more detail:

Cleaning a source image,

Creating a micro mesh,

Calculating curvature, and

Triangulation.

The cleaning of the source image is illustrated in the case of a two-dimensional (2×2)-slice and a three-dimensional (2×2×2)-volume. The cleaning of the source image means that the source image is changed so that some voxel configurations do not occur in the input voxel image. In the two-dimensional (2×2)-slice such a voxel configuration, which is changed, is:

| | |
|---|---|
| !a | a |
| a | !a |

In the three-dimensional (2×2×2)-volume such a voxel configuration, which is changed, is:

| !a | !a | | a | !a |
|---|---|---|---|---|
| !a | a | | !a | !a | wherein:
  a is defined as a voxel having a label a, and
  !a is defined as a voxel not having label a.

The two configurations, two-dimensional and three-dimensional case, have to be extended to all mirrored and rotated variants of all three dimensions. For cleaning of the source image, the two-dimensional (2×2)-slice is filled with max(a,{!a}), i.e. all voxels of the slice are labelled with that label which is most frequent in the (2×2)-slice, when a (2×2)-violation occurs. In the three-dimensional case the (2×2×2)-block is filled also with max(a,{!a}), i.e. that label which is most frequent in the (2×2×2)-volume. This process is repeated until no more violations occur.

After cleaning the source image a micro mesh is created. The micro mesh is the union of all surfaces that separate two voxels of different label in the source image and comprises a plurality of polygons each having a face. This micro mesh is the intermediate representation for the algorithm of the triangulation process to operate on.

The polygons of the intermediate representation are labelled according to the following scheme: a polygon_separating two voxels, one of label A and one of label B, is assigned the label

L=A+B*TWO_LABEL_BASE where TWO_LABEL_BASE is a positive integer that must be greater than all voxel labels occurring in the source image. TWO_LABEL_BASE is typically set to 1000. This way a unique label is assigned to each combination of voxel labels, enabling to derive the information which voxel labels are being separated by the respective polygon from the surface label alone. For creation of the micro mesh only the faces A>B, i.e. polygons having a face A>B, are used.

After creating the micro mesh the following steps are performed on the micro mesh. In a first step the connectivity of the polygons of the micro mesh is calculated, wherein vertices of the micro mesh know all faces that are connected to them and faces know about their neighbouring faces as well as the vertices that makes up the polygon. Thus the connectivity can be determined.

Afterwards, two-point-polygons are added so that neighbouring triangles/polygons of different label are separated from each other by two-point-polygons. These two-point-polygons have no individual label and the label is preferably set to −1.

Afterwards, one-point-polygons are added. This adding is carried out if more than two two-point-polygons meet at a vertex. In this case a one-point-polygon is inserted at this vertex separating the meeting two-point-polygons from each other. Two-point-polygons as well as one-point-polygons can be referred to as separators.

After the adding of two-point-polygons and/or the adding of one-point-polygons the lists of faces that are connected to each vertex are reordered. This reordering is done for all vertices that are not connected to separators, whereby the list of connected faces are ordered in an oriented fashion around that vertex, by finding a circular path for face to face until the starting face is reached. For the first three faces of each circle and their face centers p0, p1 and p2 the normal of the circle is computed by $N=(p_1-p_0)\times(p_2-p_0)$ In case that $n \cdot n_v < 0$, wherein $n_v$ is the normal at the vertex, the circular order is reversed. Thus, a consistent ordering of all faces around a vertex is ensured. During a later Delaunay-Triangulation this property can be exploited to obtain orientation for regular triangles, i.e. triangles not created from separator faces. For all faces that are connected to separators a different method is required.

After the creation of the micro mesh the curvature is calculated. For each face of the micro mesh a surface patch of given radius R around that face is obtained by region growing. R represents the so-called elimination radius and can be set to a default value, e.g. to 6 mm. It also could be estimated by a multiple, e.g. 6, of the average micro mesh edge length. The coordinates of face centers that are part of the patch are transformed so that the local surface normal of the patch points in positive z-direction. The local surface normal can be obtained by averaging over all face normals of the patch. Then the patch is approximated by a second order polynomial of the type:

$z(x,y)=ax^2+2bxy+cy^2$

Furthermore, the principal curvature radius is extracted by eigenvalue decomposition. The value of the principal curvature radius is referred to as the face curvature.

After the calculation of the local curvature the triangulation can be generated. For achieving the triangulation in a first step an appropriate gamma is determined, wherein gamma is the so-called detail balance parameter. In a descriptive way gamma can be understand as a parameter which determines how many details can be seen in the output mesh or final triangulation. For determining an appropriate gamma the triangulation is bisected till a gamma is found so that an output mesh created by utilisation of that gamma matches a predetermined target polygon count (TPC). The bisecting is carried out in an iterative way. The bisecting is performed a predetermined number of times, e.g. 10 times, whereby the bisecting is preferably truncated in case that the deviation of the achieved TPC to the predetermined TPC is less than a given percentage, e.g. less than 0.8%. Preferably, the starting range for gamma is between UpperBound=1 and LowerBound=0. For each iteration triangulate is called with gamma=(UpperBound+LowerBound)/2, i.e. the arithmetic mean of the present UpperBound and LowerBound. In this phase of the triangulation process of the exemplary embodiment of the present invention the triangulation is not performed to achieve the correct output geometry also referred to as the macro mesh or the output mesh, but only to count the numbers of triangles that would have been created. By comparing this number with the predetermined TPC it can be derived whether the present gamma is appropriate or whether an further iteration has to be performed.

Furthermore, the free parameter $R_{max}$ and $R_{min}$ can be estimated as follows:

$R_{max}$=AverageRange, and $R_{min}$=AverageRange/5,

Wherein the parameter AverageRange is defined by four times the square root of DecimationRatio, i.e. AverageRange=$\sqrt{DecimationRatio} \cdot 4$ Wherein the parameter DecimationRatio is defined by the number of the micro mesh faces divided by TPC and multiplied by the average micro mesh edge length, i.e.

$$DecimationRatio = \frac{numMicroMESHFACES \cdot AverageMicroMeshEdgeLength}{TPC}$$

$R_{max}$ and $R_{min}$ can be bounded between 0 mm and 50 mm.

After determining gamma, $R_{max}$ and $R_{min}$ a selection and thinning can be performed as a first phase of the triangulation. In a first step all micro mesh faces are added to a so-called candidate queue (LocalFaceQueue). Then all one-point-polygons are selected from the queue. In a next step the micro mesh face which has the highest local curvature and which is left in the candidate queue is extracted and added to the selection. Starting from this face all faces are removed from the candidate queue which faces are located within a neighbourhood of range R. This step is called thinning. This step is repeated until the candidate queue is empty. The neighbourhood R can be defined by the so-called curvature mapping function and is restricted to the interval $[R_{min}, R_{max}]$, wherein $R_{min}$ describes the minimum elimination radius and $R_{max}$ describes the maximum elimination radius.

The curvature mapping function can be defined by:

$$R(c, nu) = pow(c, nu) \cdot (R_{max} - R_{min}) + R_{min},$$

wherein pow( ) is the so called power function and is defined by $$pow(x, y) = x^y,$$

wherein pow( ) is a function defined for double precision. Nu( ) is defined by:

$$nu(gamma) = \frac{\log(0.5)}{\log(powf(gamma, 0.1))},$$

wherein powf( ) is the single precision version of pow( ). C( ) is defined as:

$$c(curv) = 2 \cdot \frac{\mathrm{atan}\frac{1}{curv}}{\pi} \text{ and } c(0) = 1,$$

wherein curv is defined as the surface curvature of a micro mesh face as determined in the curvature calculating step.

It has to be noted that while performing the thinning step R is preferably divided by 2 for a two-point-polygon because higher detail is needed in junction areas which are indicated by the existence of two-point-polygons. Furthermore, neighbourhood is preferably restricted to faces having the same label, i.e. thinning for junction faces and ordinary faces is performed independently.

After finishing the selection and the thinning an adaptive refinement can be performed as the second phase of the triangulation. In the adaptive refinement phase all selected faces become region seed points from which simultaneous region growing is performed until the entire surface is covered. The result of this region growing is the Voronoi-graph approximation. From this Voronoi-graph its dual the Delaunay-Triangulation can be created which represent the output mesh. The details of the Delaunay-Triangulation step will be described later. In case the triangulation is only performed to count the triangles, i.e. to determine the appropriate gamma, the triangulation is stopped at this stage and it is returned to the next iteration of the gamma determination procedure. In case that the output mesh is created some further steps are performed in the following.

The first of these further steps is the calculation of the connectivity on the output mesh. This can be done in the same way as the calculation of the connectivity of the micro mesh in the creation of the micro mesh. Further, two-point-polygons are added the same way as by the creation of the micro mesh, i.e. neighbouring triangles of different labels are separated from each other by two-point-polygons. Furthermore, repair faces are searched for by a first method (method 1). For finding repair faces each triangle of the output mesh which triangle has not three neighbours is reported as broken, whereby separators, i.e. two-point-polygons and one-point-polygons, are counted as neighbours. Separators itself are never reported as broken. If a triangle is reported as broken, i.e. has been assigned a repair face candidate, the candidate is added to the repair face list.

In a second of these further steps, if no repair faces could be found by method 1, a smooth border faces substep is performed in which all ordinary surface vertices of the output mesh that connected via an edge to a junction vertex, undergo a centroid smooth. This is done in an iterative procedure while using a predetermined number of iteration, e.g. 100 iterations. Then the separators are removed from the macro mesh and the faces are reconnected at the label borders. Afterwards it is searched for repair faces according to a second method (method 2). Method 2 is similar to method 1, but has a different criteria for broken faces. If the normals of two neighbouring faces have a scalar product of less than –0.95 they are considered as being broken. Alternatively, this criteria could possibly be replaced by a self-intersection-detection, which would be probably slower in computing but would guarantee the elimination of all self intersections.

If no repair faces are found the generated mesh is returned as the output mesh of the triangulation, i.e. the method according to the exemplary embodiment of the invention is finished. If repair faces are found these faces are added to the face selection and the adaptive refinement is repeated, starting with the region growing.

In the following the creating of the Delaunay-Triangulation is explained in greater detail. While doing the Delaunay-Triangulation for each micro mesh vertex the following is done. In a first step all faces which are attached to the vertex are stored in the so-called RegionList. From this RegionList the so-called FaceRegionList can be obtained, wherein the FaceRegionList is defined by all elements of the RegionList without the elements being part of the SeperatorRegions, i.e.

FaceRegionList=RegionList\{SeperatorRegions}

Afterwards one attached face is arbitrarily selected as a repair face, whereby the selected face is not part of the face selection and whereby the selected face is not already selected as a repair face. If later on a result triangle gets associated with this micro mesh vertex and the triangle is reported as broken by the methods for finding repair faces (see under adaptive refinement), this face is added to the face selection of the selection step of the triangulation. If three or more regions are found at this vertex neighbourhood relations are established of those regions, wherein this time neighbourhood between ordinary faces and separators is allowed, and the RegionList is partitioned, which is explained afterwards in greater detail. Furthermore, if three or more regions are found for each region one output polygon is created by connecting the region seed points of the contained regions, wherein the face centers of the region seed faces become the vertices of the output triangulation. If separators are involved at this micro mesh vertex, all associated output faces are marked as orientation ambiguous while the other output faces are properly aligned. It should be noted that if no output mesh is created, i.e. if only the appropriate gamma is determined, only the resulting triangles are counted.

In the following the partitioning of the RegionList is explained. In a first step a first face is extracted from the FaceRegionList. As a next step the faces at the micro mesh vertex belonging to the region of the extracted face are counted. In case that the counted number plus the number of separators at the vertex is less than three, the extracted region is removed from the FaceRegionList and the partitioning is restarted at the first step. If no separators are part of the RegionList no partitioning is required, otherwise as a further step the largest patch of faces having the same surface label as the faces of the region of the extracted first face are determined, wherein the largest part preferably is not divided by separators. All faces being part of this path are added to a so-called subset. Furthermore, all separators bordering to this path are determined and if a one-point-polygon is part of the RegionList, it is added also to the subset.

As a next step an arbitrary circular path is determined for the regions of the subset. This circular path represents one partition and all non-separator faces/regions of this path are removed from the FaceRegionList. If the FaceRegionList is not empty, the partitioning is restarted at the first step to obtain the other partitions.

In the following the similar detailed exemplary embodiment is illustrated with a kind of Pseudo-Code.

The triangulation process is divided into four major tasks:
1. Cleaning Source Image
2. Create Micro Mesh
3. Calculate Curvature
4. Triangulate Each of the four tasks is described in the following in more detail.

Ad 1: Cleaning Source Image
The following voxel configurations must not occur in the input voxel image:

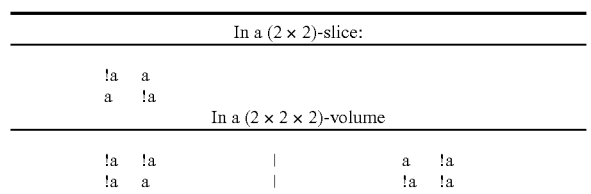

a: = a voxel of label a; !a a voxel not having label a

The two above configurations have to be extended to all mirrored and rotated variants of all three dimensions.

If a 2×2-violation occurs, the 2×2-block is filled with max (a,{!a})

If a 2×2×2-violation occurs, the 2×2×2-block is filled with max(a,{!a})

The process is repeated until no more violations occur.

Ad 2: Creating Micro Mesh
The micro mesh is the union of all surfaces that separate two voxels of different label in the source image. This is the intermediate representation for the algorithm to operate on.
A+B*TWO_LABEL_BASE
TWO_LABEL_BASE:=1000
Only the faces A>B are created.

The following tasks are performed with the micro mesh in this order:
Step 1: calculate connectivity( )
Step 2: Add 2-point-polygons( )
Step 3: Add 1-point-polygons( )
Step 4: reorder-Face-connections( )
These methods are described at the end of the annex.

Ad 3: Calculating Curvature
For each face of the micro mesh a surface patch of given radius R around that face is obtained by region growing. The coordinates of face centers that are part of the patch are transformed such that the local surface normal of the patch points in positive z-direction. The local surface normal is obtained by averaging over all face normals of the patch. Then the patch is approximated by a second order polynomial $(z(x,y)=ax^2+2bxy+cy^2)$ and the principal curvature radius is extracted by eigenvalue decomposition. This value is referred to as face curvature.

R is set to 6 millimeters by default. It could also be estimated by average_micro_mesh_edge_length*6.

Ad 4: Triangulate
Layer 0: Find Gamma/Find Rmin/Rmax
Triangulate is bisected to find an appropriate gamma, matching the given Target polygon count (TPC).

10 iterations are performed, if the deviation is less than 0.8% the bisecting is cancelled prematurely. The starting range for gamma is UpperBound=1, LowerBound=0. Each iteration triangulate is called with gamma=(UpperBound+LowerBound)/2. Triangulate( ) is set not to create geometry, but only to count numbers of triangles that would have been created.

After a fitting gamma has been found, triangulate is called a last time, this time creating output geometry (referred to as macro-mesh).

The free parameters Rmin, $R_{max}$ are estimated as follows:
Decimation_ratio:=(numMicroMeshFaces/TPC)*AverageMicroMeshEdgeLen,
AverageRange:=sqrt(DecimationRatio)*4.
Rmin=AverageRange/5
Rmax=AverageRange
Rmin and Rmax are clamped to [0 . . . 50]mm.

Layer 1: Triangulate
Phase 0: Selection & Thinning
Add all micromesh-Faces to candidate queue (LocalFaceQueue).
selected all 1-point-polygons from queue
extract face with highest curvature that is left in queue, add it to selection, remove neighbourhood of range R from candidate queue (called Thinning) and repeat until queue is empty. R is defined by the curvature mapping function.
Detail 1) R is divided by 2 for 2-point-polygons because higher detail is needed in junction areas.
Detail 2) neighbourhood is only possible between faces of the same label, i.e. Thinning for junction-faces and ordinary faces is performed independently.
Phase 1: Adaptive refinement
Step 1: Selected Faces become Region seed points Simultaneous region growing from all seed points until entire surface is covered (result: Voronoi-graph-approximation)
Step 2: Create Delaunay-Triangulation( ) for this Voronoi-graph (output mesh)
Step 3: if only triangle-count-estimate is required, return at this point Step 4: otherwise: calculate connectivity on output mesh
Add 2-point-polygons and find repair faces (method 1).
Step 5: if no repair faces could be found by method 1
Smooth border faces, remove separators from macro-mesh and reconnect faces at label borders,
And find repair faces (method 2)
Step 6: if no repair faces are found return the output mesh,
Otherwise add the repair faces to the face selection and repeat from step 1.
Layer 2: Create Delaunay-Triangulation
For each micro mesh vertex do the following:
  find all faces attached to the vertex, store all regions in RegionList
  FaceRegionList=RegionList\{SeparatorRegions}
  One arbitrary attached face is selected as repair face (must not be part of Face Selection and not already be selected as repair face). If later on a result triangle gets associated with this micro mesh vertex and the triangle is reported broken by the find repair faces methods, this repair face is added to Face Selection.
  If 3 or more regions are found at this vertex:
    Establish neighbourhood relations of those regions (this time neighbourhood between ordinary faces and separators is allowed).
    Partition the Region List (see below)
    For each region Partition create one output polygon by connecting the region seed points of the contained regions (the face centers of the region seed faces become the vertices of the output triangulation). If separators are involved at this micro mesh vertex, all associated output faces are marked as orientation_ambiguous. The other output faces are properly aligned.
  Note: if no output mesh is desired only the resulting triangles are counted.
Partitioning the Region List:
  Step 1: extract first face from FaceRegionList (associated Region will be referred as REGION).
  Step 2: count faces at the micro-mesh vertex belonging to the region of the extracted face. If this number+the number of separators at the vertex are less than 3 remove the extracted region from FaceRegionList and restart at Step 1.
  Step 3: if no separators are part of RegionList no partitioning is required. Otherwise proceed to step 4:
  Step 4: find the largest patch (not divided by separators) of faces having the same surface label as the faces of REGION. Also find all separators bordering to this patch. If a 1-point-polygon is part of RegionList, it is added also. This collection is referred to as SUBSET.
  An arbitrary circular path is found for the regions of SUBSET. This path is one Partition. Remove all non-separator faces/regions of this path from FaceRegionList. If FaceRegionList is not empty, repeat at step 1 to obtain the other Partitions.
Curvature Mapping Function (curv→R)
  curv:=surface curvature of a micro mesh face
  gamma:=detail balance parameter
  Rmin=minimum elimination radius
  Rmax=maximum elimination radius
  c(curv)=2*a tan(1/curv)/PI
  c(0)=1
  nu(gamma)=log(0.5)/log(powf(gamma,0.1))
  R(c,nu)=pow(c,nu)*(Rmax−Rmin)+Rmin
  R is restricted to [Rmin . . . Rmax].

Find Repair Faces (Method 1)
  Each triangle of the output mesh that has not three neighbours is reported as broken.
  Separators are counted as neighbours. Separators are never broken. If a broken face has been assigned a repair face candidate, the candidate is added to the repair face list.
Find Repair Faces (Method 2)
  As method 1 only with a different criteria for broken faces. If the normals of two neighbouring faces have a scalar product of less than −0.95 they are considered broken.
  This criteria could possibly be replaced by a self-intersection-detection. This would be slower, but would guarantee the elimination of all self-intersections.
Smooth Border Faces
  All ordinary surface vertices of the output mesh that connected via an edge to a junction vertex, undergo a centroid smooth (100 iterations).
Calculate Connectivity
  Vertices of both macro mesh and micro mesh know all faces that are connected to them. Faces know about their neighbouring faces and of course the vertices that make up the polygon.
Add 2-Point-Polygons
  Neighbouring triangles of different label are separated from each other by 2-point-polygons. The 2-point-polygons have no individual label (label −1).
Add 1-Point-Polygons
  If more than two 2-point-polygons meet at a vertex, a 1-point polygon is inserted at this vertex, separating the meeting 2-point-polygons from each other. 2-point-polygons and 1-point-polygons are both referred to as separators.
Reorder Face Connections
  For all vertices the list of connected faces are ordered in an oriented fashion around the vertex, by finding a circular path for face to face until. For the first three faces of this circle and their face centers p0, p1 and p2, ignoring the at most one one-point-polygon, the normal is computed by $$n=(p1-p0)\times(p2-0)$$

If $n*n_v<0$, $n_v$ being the normal at the vertex, the circular order is reversed.

Thus a consistent ordering of all faces around a vertex is ensured. During the Delaunay-Triangulation this property is exploited to obtain an orientation for regular triangles. For regular vertices (not connected to separators) the reordered face lists may be stored in the faces at vertex list, for non-regular vertices there is more than one path such that it cannot be stored in a single list.

Figure 2A:
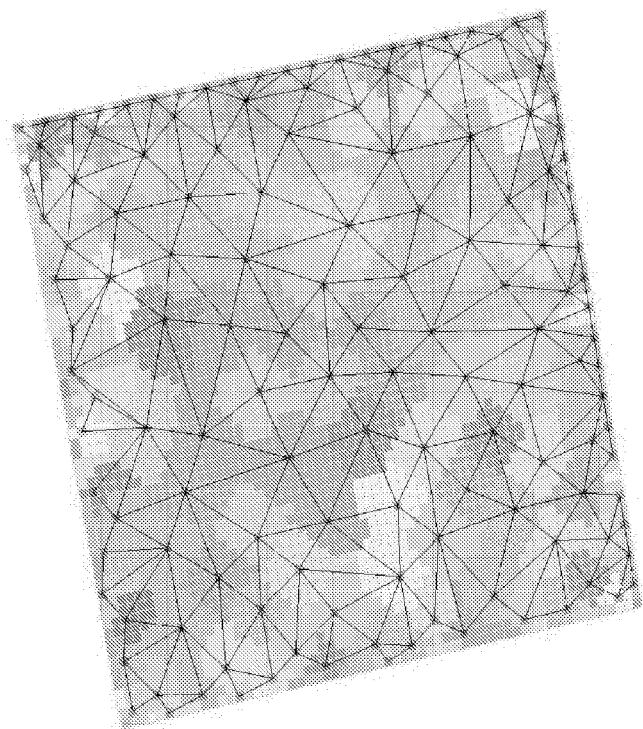
FIG. 2a shows a Voronoi-graph and a Delaunay-Triangulation of a cube.

FIG. 2 shows schematic examples of triangulations obtained according to an exemplar embodiment of the present invention, wherein FIG. 2a shows a Voronoi-graph and a Delaunay-Triangulation of a cube. The black dots represent the vertices selected by the thinning step and used to generate the triangulation. Each vertex corresponds to a region of the surface of the cube. These regions are depicted in different grayscales and represent the Voronoi-graph. From the Voronoi-graph the Delaunay-Triangulation can be obtained which is the dual of the Voronoi-graph and which is depicted as the black lines in FIG. 2a.

Figure 2B:
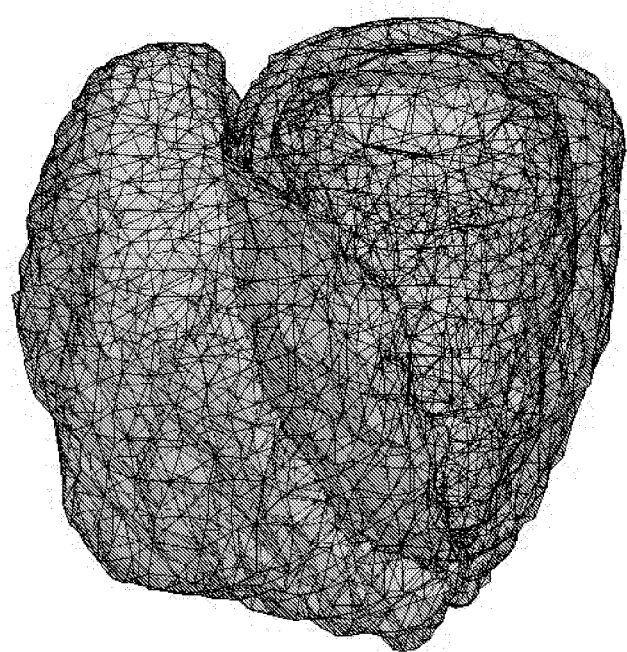
FIG. 2b shows a triangulation of a left and a right ventricle and a myocardium of a heart.

FIG. 2b shows a triangulation of a more complex structure namely a triangulation of a heart. In FIG. 2b the black lines also represents the Delaunay-Triangulation. In FIG. 2b the left and a right ventricle and a myocardium of a heart, can be seen.

Thus, as described by the description of the preferred embodiments, one aspect of the present invention can be seen in the decomposition of so called T-junctions into triangles and two-point-polygons, thus leading to the fact that the 2-manifold condition is met and consequently standard triangulation methods can be used.

Figure 3:
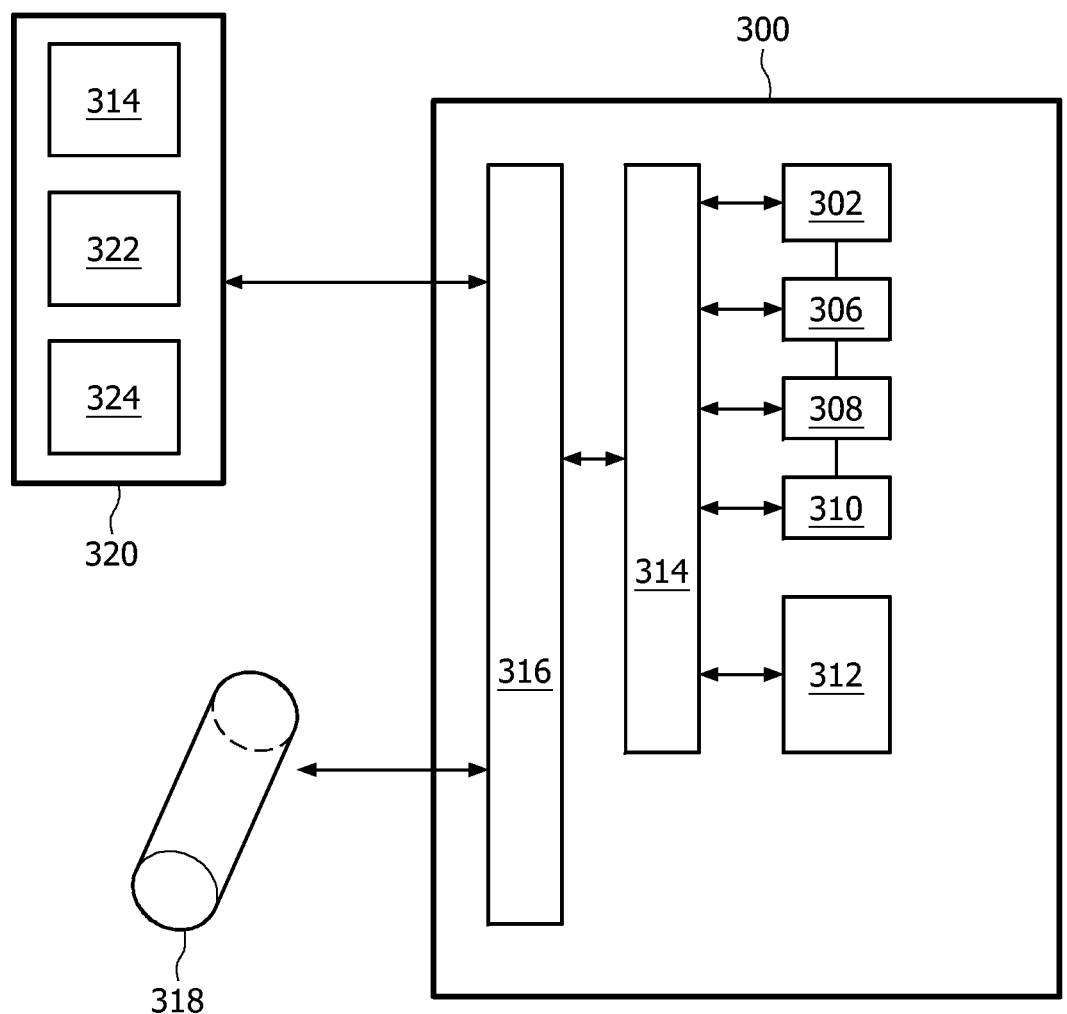
FIG. 3 shows the system according to the invention in a schematic way.

FIG. 3 shows the system according to the invention in a schematic way. As shown in FIG. 3 a system 300 for producing a triangulation of a surface of a physical object comprises: a means 302 for generating an intermediate mesh representation of the surface out of surface voxels; a means 306 for detecting at least one T-junction in the intermediate mesh representation; a means 308 for decomposing of the at least one T-junction into at least one triangle and at least one two-point-polygon; a means 310 for generating the triangulation of the surface out of the modelled intermediate mesh representation. The system 300 further comprises a processor 312 and a software bus 314 that is designed to transport data between the means 302, 304, 306 and 310 and the processor 312 to enable the processor to perform the method steps according to the invention. The results of the intermediate method steps are shown to a user through display device 314. Alternatively only the end result, i.e. the triangulated structure is shown on display device 314. The system is connected to input and output devices through the interface means 316. This interface means 316 comprises interfacing means well known to a person skilled in the art to enable communication of the respective input and output devices with the system 300. The system 300 as described above can be part of an image acquisition device 318 like a Computed Tomography (CT) apparatus and/or an image workstation 320 further comprising input devices 322 like a mousepad or keypad, an output device, like the display device 314 and a computer station 324. In the system 300 the enumerated means can be embodied by one and the same item of computer readable software or hardware. The invention can be implemented by means of hardware comprising several distinct elements, and by means of a suitably programmed computer.

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

The invention claimed is:

1. A method for producing a triangulation of a surface of a physical object, the method comprising the steps of:
   cleaning, by a processing device, a source image of the physical object, wherein the cleaning comprises changing the source image to remove predetermined voxel configurations,
   generating, by the processing device, an intermediate mesh representation of the surface out of surface voxels of the source image,
   detecting, by the processing device, at least one T-junction in the intermediate mesh representation,
   decomposing, by the processing device, the at least one T-junction into at least one triangle and at least one two-point-polygon, and
   generating, by the processing device, the triangulation of the surface out of the modelled intermediate mesh representation.

2. The method according claim 1, further comprising the step of decomposing two two-point-polygons which meet at a common voxel by inserting a one-point-polygon.

3. The method according to claim 1, wherein the physical object comprises at least two distinct sections, the method further comprising the step of labelling at least some of the surface voxels prior to generating the intermediate mesh representation the labelling representing the belonging of each labelled surface voxel to one of the at least two distinct sections.

4. The method according to claim 3, wherein the step of decomposing further comprises the substep of connecting at least one pair of adjacent voxels having different labels by a two-point-polygon and/or a one-point-polygon.

5. The method according claim 4, further comprising the substep of connecting each pair of adjacent voxels having different labels by a two-point-polygon and/or one-point-polygon.

6. The method according to claim 1, further comprising the step of region growing after decomposing of the at least one T-junction.

7. The method according to claim 6, wherein the region growing is done by using a local curvature-adaptive thinning process.

8. The method according to claim 6, wherein the region growing is adapted so that no voxel having one label is shifted into a surface region comprising voxels of another label.

9. The method according to claim 6, wherein the intermediate mesh representation comprises triangles and boundary edges and wherein the region growing is adapted so that no voxel being part of a triangle becoming a boundary edge and that no voxel being a boundary edge becoming a triangle.

10. The method according to claim 1, wherein the generation of the triangulation is done by Delaunay-Triangulation.

11. The method according to claim 1, further comprising the step of correcting of an orientation of triangles associated with the at least one T-junction.

12. The method according to claim 1, wherein if multiple connected T-junctions are detected, the T-junctions are associated with a correct subset of neighboring surface labels.

13. A system for producing a triangulation of a surface of a physical object, the system having a processing device which is adapted to perform the following method steps:
   cleaning, by the processing device, a source image of the physical object, wherein the cleaning comprises changing the source image to remove predetermined voxel configurations,
   generating, by the processing device, an intermediate mesh representation of the surface out of surface voxels of the source image,
   detecting, by the processing device, at least one T-junction in the intermediate mesh representation,
   decomposing, by the processing device, of the at least one T-junction into at least one triangle and at least one two-point-polygon, and
   generating, by the processor, the triangulation of the surface out of the modelled intermediate mesh representation.

14. Image acquisition device comprising the system according to claim 13.

15. Image workstation comprising the system according to claim 13.

16. A non-transitory computer readable medium in which a program for producing a triangulation of a surface of a physical object is stored, which program comprises the following method steps if executed by a processor:
   cleaning a source image of the physical object, wherein the cleaning comprises changing the source image to remove predetermined voxel configurations,
   generating an intermediate mesh representation of the surface out of surface voxels of the source image,
   detecting at least one T-junction in the intermediate mesh representation, decomposing of the at least one T-junction into at least one triangle and at least one two-point-polygon, and generating the triangulation of the surface out of the modelled intermediate mesh representation.

17. A program element stored on a non-transitory computer readable medium for producing a triangulation of a surface of a physical object, which program element comprises the following method steps if executed by a processing device:

cleaning, by the processing device, a source image of the physical object, wherein the cleaning comprises changing the source image to remove predetermined voxel configurations, generating, by the processing device, an intermediate mesh representation of the surface out of surface voxels of the source image, detecting, by the processing device, at least one T-junction in the intermediate mesh representation, decomposing, by the processing device, of the at least one T-junction into at least one triangle and at least one two-point-polygon, and generating, by the processing device, the triangulation of the surface out of the modelled intermediate mesh representation.

* * * * *